United States Patent [19]

Tagawa

[11] 4,030,107

[45] June 14, 1977

[54] ELECTROGRAPHIC RECORDING DEVICES EMPLOYING ELECTROSTATIC INDUCTION ELECTRODES

[75] Inventor: Takao Tagawa, Kashihara, Japan

[73] Assignee: Sharp Kabushiki Kaisha, Osaka, Japan

[22] Filed: Sept. 12, 1975

[21] Appl. No.: 613,033

[30] Foreign Application Priority Data

| | | |
|---|---|---|
| Sept. 12, 1974 | Japan | 49-105614 |
| Sept. 18, 1974 | Japan | 49-108218 |
| Sept. 20, 1974 | Japan | 49-109198 |

[52] U.S. Cl. ............................ 346/155; 346/139 C

[51] Int. Cl.² ................ G03G 15/044; G01D 15/06

[58] Field of Search ......... 346/74 ES, 74 E, 74 EE, 346/74 S, 74 SB, 74 SC, 74 EH, 139 C

[56] References Cited

UNITED STATES PATENTS

| | | | |
|---|---|---|---|
| 2,955,894 | 10/1960 | Epstein | 346/74 EE |
| 3,469,028 | 9/1969 | Yamamoto | 346/74 EE |
| 3,470,563 | 9/1969 | Starr | 346/74 EH |
| 3,483,566 | 12/1969 | Rothgordt | 346/74 EE |
| 3,564,556 | 2/1971 | Tsukatani | 346/74 EE |
| 3,611,419 | 10/1971 | Blumenthal | 346/74 EE |
| 3,718,936 | 2/1973 | Rice, Jr. | 346/74 EH |

FOREIGN PATENTS OR APPLICATIONS

| | | | |
|---|---|---|---|
| 47-51011 | 2/1968 | Japan | 346/74 EE |

*Primary Examiner*—Jay P. Lucas
*Attorney, Agent, or Firm*—Birch, Stewart, Kolasch & Birch

[57] ABSTRACT

A pair of high voltage switching circuits associated with first and second sources of voltage supply are connected with a pin-shaped record electrode through a resistor and an electrostatic induction plate, respectively. The electrostatic induction plate is disposed very closely adjacent the record electrode or its associated lead wires in a manner to establish an electrostatic capacitive coupling therebetween. A resistor, capacitor combination provides an integration circuit for current flow from the first source of voltage supply to the record electrode and also provides a differentiation circuit for current flow from the second voltage supply source to the record electrode. Voltages from the first and second sources are added together in an incremental fashion via the resistor-capacitor combination. The sum of the voltages which exceeds the threshold value of the voltage, i.e. the ignition voltage, is applied to the record electrode to produce a spontaneous gas discharge.

7 Claims, 16 Drawing Figures

ELECTROGRAPHIC RECORDING DEVICES EMPLOYING ELECTROSTATIC INDUCTION ELECTRODES

BACKGROUND OF THE INVENTION

1. Field of the Invention

The invention generally relates to an elecrographic recording device in which a gaseous discharge is produced by means of a multi-pin electrode assembly, so that the thus obtained charged particles, are disposed on a record medium to make a record of information thereon. More particularly, the present invention relates to interconnection means between record electrodes and a source of information and a method of controlling the record electrodes in the electrographic recording or printing device.

2. Description of Prior Art

Many prior art electrographic recording or printing devices are known which employ coincident current drive of record electrodes in order to reduce the necessary number of switching circuits operatively associated with the respective record electrodes. As one example, an electrographic type page printer described in U.S. Pat. No. 2,955,894 comprises a plurality of similar pin-shaped stationary record electrodes having the discharge areas thereof in surface alignment, anvil electrodes having positions and similarly spaced from the discharge areas to define a gap therebetween for the reception of a record medium and means for establishing an electric field by a difference in potential exceeding a threshold value when both of the record and anvil electrodes are selected. Although the necessary number of high-voltage switching elements for electrode selection is advantageously reduced, a severe disadvantage of this approach is a much higher accuracy of relative alignments between the record and anvil electrodes required for obtaining a good quality reproduction.

Another form of electrographic recording in the prior art involves first and second sources of voltage switchable between first and second voltage levels and first and second impedance elements interposed between a record electrode and the first and second sources, such a technique is disclosed in U.S. Pat. No. 3,483,566. However, these sources of voltages should both provide a voltage higher than the threshold value and therefore switching elements of high breakdown voltage are required.

SUMMARY OF THE INVENTION

In accordance with the present invention, there is provided an electrostatic induction plate very closely adjacent a pin-shaped record electrode or its associated leading wire so that an electrostatic coupling is established between the induction plate and the record electrode or its leading wire to form a capacitor therebetween. The present device includes a pair of high-voltage switching means, one being connected with the record electrode via a resistor (or impedance element) and the other being connected with the record electrode through the electrostatic induction plate or the capacitor, thereby simplifying interconnection means between the record electrode and the voltage sources. Operating voltage at the record electrode is a sum of output voltage from the one voltage source and that from the other voltage source, thereby enabling record operation at a lower source voltage and facilitating voltage supply circuit design. Moreover, in accordance with the present invention a ghost image will not occur even if the induction plate is not maintained at an accurate position with respect to the record electrode.

DETAILED DESCRIPTION OF INVENTION

Figure 1:
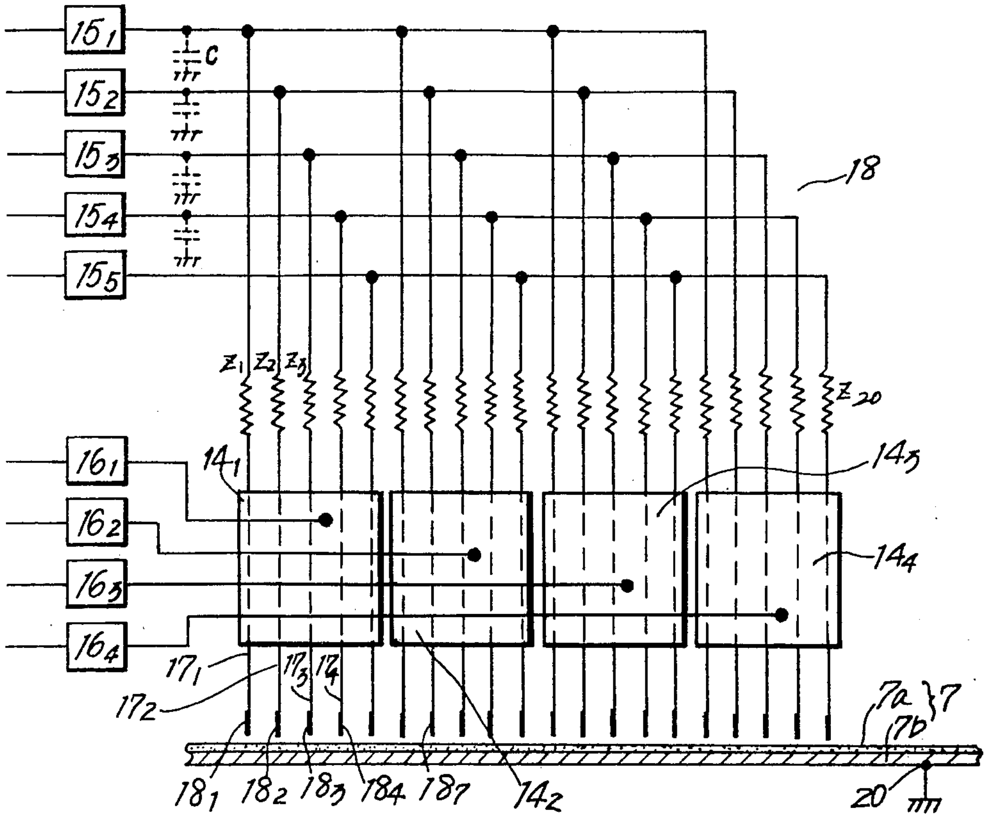
FIG. 1 is a schematic wiring diagram of one preferred form of an electrographic recording device constructed in accordance with the invention.

In FIG. 1, a recording or printing head substrate made of a dielectric plate or dielectric film generally designated at 18 carries equally speced record electrodes $18_1$, $18_2$, $18_3$ - - - . The record electrodes $18_i$ are formed by depositing a metal layer over the entire surface of the record head substrate 18 and selectively removing undesired portions through the use of conventional photoetching technology. A pin-shaped record electrode assembly is thus obtained. As an alternate, discrete fine metal strips may be aligned in a predetermined spaced relationship. In addition, the record electrodes may be made in the form of a matrix.

The respective ones $18_i$ of the record electrodes are connected with the corresponding lead wire 17*a* for the reception of input signals applied thereto. The lead wires $17_i$ are formed from the deposited metal layer or metal strips concurrently with the formation of the record electrode assembly. The respective lead wires $17_1$, $17_2$, - - - are coupled with impedance elements, for example, resistors $Z_1$, $Z_2$, - - - . Other impedance elements which may be coupled with the lead wires $17_i$ instead of the resistor $Z_i$ are proper elements which show high impedance for high frequency components when viewing a high-voltage switching circuit to be described later from the record electrode $18_i$, and preferably inductance elements.

The record electrodes $18_1$, $18_2$ - - - in spaced alignment are divided into a predetermined number of groups (in the given example, four groups each group containing five record electrodes) and corresponding record electrodes in each of the groups are connected in common, the thus commonly connected record electrodes being connected with the first high-voltage switching circuits $15_1$, $15_2$ - - - . Therefore, when any one of the first high-voltage switching circuits is selected to permit voltage supply, the specific record electrodes within each group will be supplied via the resistors with voltage. Needless to say, when two or more first high-voltage switching circuits are on, the corresponding number of the record electrodes are simultaneously supplied with voltage.

Over the upper surface of the recording head substrate 18 there are provided electrostatic induction plates $14_1$, $14_2$, - - - for the multi pin-shaped electrodes $18_1$, $18_2$, - - - , providing electric insulation between the respective record electrodes $18_i$ and the lead wires $17_i$. One way to install the induction plates 14 over the substrate consists of depositing a spacer member of several microns or several tens microns thick over the array of the record electrodes and depositing metal plates over the dielectric spacer through the use of the metal evaporation or silk screen printing techniques.

The respective induction plates $14_1$, $14_2$ - - - are provided for each group of the record electrodes in such a manner to form a capacitor in cooperation with the record electrode $18_i$. In order to enhance the degree of electrostatic coupling, it is necessary to minimize the spacing between the induction plates $14_h$ and the record electrodes $18_i$, as the breakdown voltage of the spacer member permits, and to utilize a high dielectric constant material as the dielectric spacer. It is preferrable to utilize a thin film of polyimide or polyethylene telephthal. Although the foregoing sets forth the deposition of the induction plates $14_1$, $14_2$ - - - extending over the record electrode assembly, they may be placed over the lead wires $17_1$, $17_2$ - - - physically coupled with the record electrodes $18_1$, $18_2$ - - - . In this instance a thin film spacer member is inserted therebetween. To obtain good electrostatic coupling, an enlarged area may be provided at a portion of the lead wires $17_1$, $17_2$ - - - such that the induction plates are disposed over such an enlarged area to form the capacitor.

Moreover, in the case where the metal strips are employed as the record electrodes, their lead wires are electrically isolated from one another in the same way as the conventional shielding wire. The thus isolated lead wires are covered with good conductors, which serve as portions of the induction plate or electrode plates $14_1$, $14_2$ - - - .

The respective induction plates $14_1$, $14_2$ - - - are connected with second high-voltage switching circuits $16_1$, $16_2$ - - - which are switchable between first and second voltage levels to supply the respective electrodes with two discrete voltage levels corresponding to their on and off condition as the first high-voltage switching circuits $15_1$, $15_2$ - - - operate. Instead, a pulse-transformer may be employed as a switching element accompanying the function of boosting an input voltage (e.g. 5 – 6 volts) up to a considerably high voltage (e.g., 300 volts) in response to its on and off condition.

Figure 4:
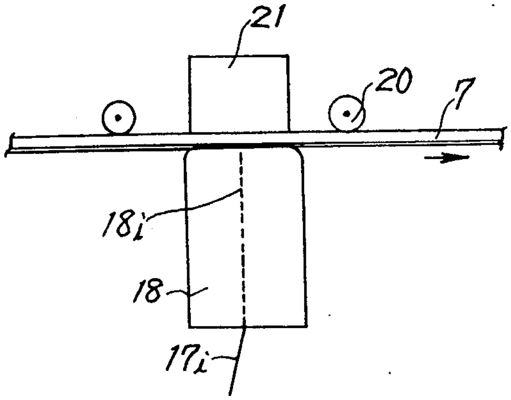
FIG. 4 is an enlarged side view of a record electrode used in the recording device of FIG. 1.

An additional electrode 20 is effective to connect a low resistance layer $7_b$ of record medium 7 to ground potential with reference to the record electrodes on the recording head board. As will be seen from FIG. 4, electrode 20 is a roller configuration in electrical engagement with the resistor layer $7_b$ of the record medium 7. In other words, the roller electrode 20 serves to hold the record medium 7 at ground potential and to aid in transporting the same. By an elastic member 21 such as felt or conductive rubber leading to ground potential or reference potential, the record medium 7 is forced against the recording surface of the record electrode assembly.

Figure 5:
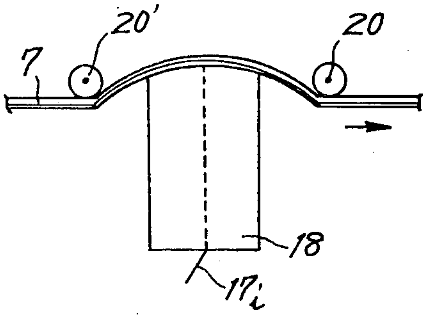
FIG. 5 is an enlarged side view of a modification of FIG. 4.

FIG. 5 shows an alternate method of transporting the record medium 7 wherein the recording head substrate 18 is formed in an upwardly oriented convex shape between the rollers 20, 20' to force the record medium 7 against the record electrode assembly.

As noted above, since the low resistance layer $7_b$ of the record medium 7 functions as the conductor to hold the record medium 7 at ground potential, its lower resistance value permits good or well-defined recording thereon.

The recording operation of the above discussed record electrodes will be now explained with reference to voltage waveform diagrams of FIGS. 2 and 3.

Electrostatic recording on the record medium 7 will be carried out in response to application of a voltage higher than the threshold level of voltage (in general, 350 – 400 volts). A record image will not occur when the applied voltage is less than the threshold level. It will be noted that recording occurs without regard to the polarity of the applied voltage.

The following description is only for the recording of negative electric charges. It will be understood that the formation of positive electric charges may be achieved by reversal in the polarity of the applied voltage.

Figure 2:
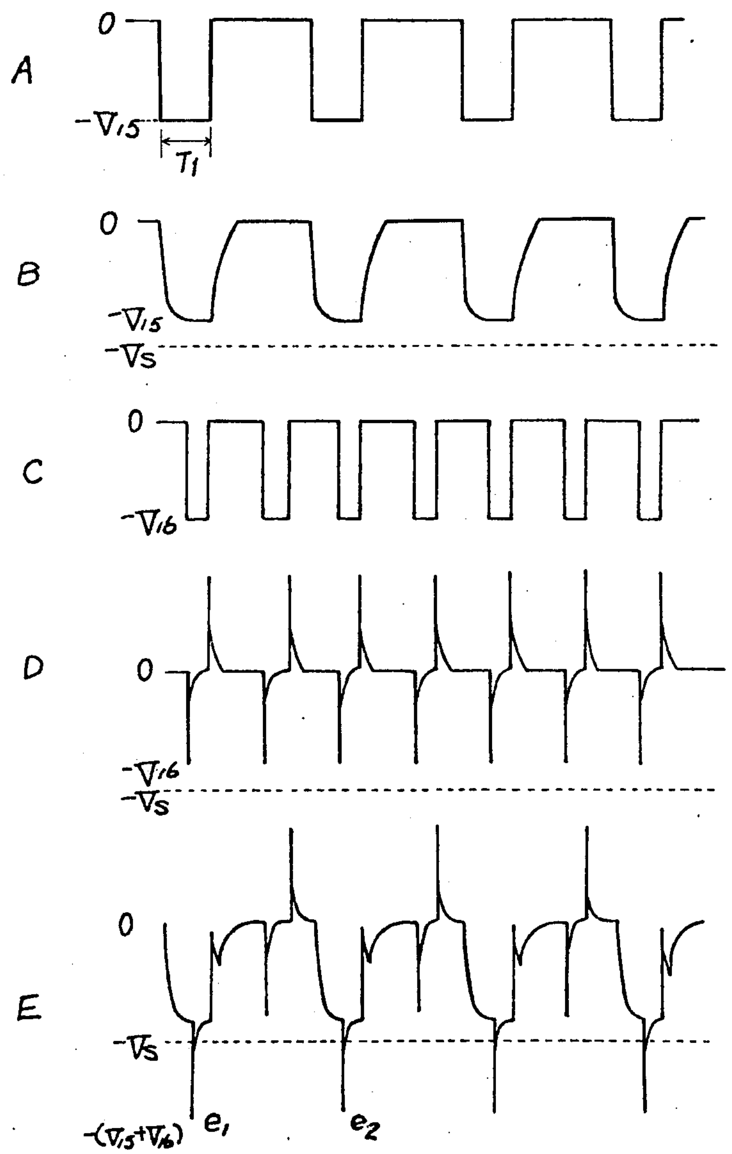
FIG. 2, consisting of A through E, and 3, consisting of A through G, are time charts of waveforms occurring within the recording device of FIG. 1.

The specific first high-voltage switching circuit $15_k$ selected in accordance with its input signal becomes operative to produce its output signal of the waveform changeable between 0 volts and $-V_{15}$ volts as illustrated in FIG. 2(A). It follows that the record electrodes $18_k$, $18_{k+5}$, $18_{k+10}$, - - - are supplred with voltage via the resistor $Z_k$, $S_{k+}$, $Z_{k+10}$, - - - . By virtue of the resistors disposed between the record electrodes and ground and between the record electrodes and the induction plate, a high-frequency component is removed within voltage supplied to the record electrode $18_k$. This results in the waveform B derived from the integration effects due to a resistor-capacitor combination. It will be seen from FIG. 2 that only leading and trailing transitions occur and therefore changes in the peak value are not evaluated. In other words, the resistor-capacitor combination serves as an integration circuit for the voltage supplied from the first high-voltage switching circuit to the record electrode therethrough. The voltage level $-V_{15}$ is selected to establish a predetermined relationship $| -V_{15} | < | -V_s |$ wherein $-V_s$ is the threshold level of voltage or ignition voltage.

Subsequently, when the input signal is impressed on the second high-voltage switching circuit $16_l$ for operation, it initiates switching performances so that the signal of the pulse waveform switchable between zero volts and $-V_{16}$ volts as viewed from FIG. 2(C) is supplied to the induction plate $14_l$. In order to ensure stable and accurate record operation, it is preferrable that output voltage from the second high-voltage switching circuit $16_l$ is of the sharp leading and trailing transitions as compared with the pulse waveform viewed from FIG. 2(A).

Because the output voltage from the second high-voltage switching circuit $16_l$ is electrostatically coupled via the induction plate $14_l$ with the record electrode and the leading wire and via the resistor with the leading wire, the record electrodes confronting the induction plate $14_l$ receive a signal of the waveform of FIG. 2(D) which is a differentiation of the pulse waveform of FIG. 2(C). The peak value in the waveform D is substantially equal to the peak value $\pm V_{16}$ of the waveform C, though changing dependent upon the leading edge of the waveform C. In other words, the resistor-capacitor combination serves as a differentiation circuit for the voltage supplied from the second high-voltage switching circuit to the record electrodes therethrough. The voltage level $-V_{16}$ is similarly correlated under the relationship $|-V_{16}| < |-V_s|$.

As a result, all the record electrodes which are spaced against the induction plate $14_l$ being supplied with the input signals, are supplied with the signal of the waveform D. At this time the remaining record electrodes which are spaced against non-selected induction plates are prohibited to receive the signal of the waveform D, because a filter circuit is established due to capacitors between the resistors, the high-voltage switching circuit, the leading wires and ground.

The voltage level supplied to the record electrode will be at $-V_{15}$ or $-V_{16}$ respectively provided that the first and second high-voltage switching circuit $15_k$ and $16_l$ operate independently of each other. This implies that the threshold level of voltage $-V_s$ necessary for recording operation is not exceeded. Operation of only one switching circuit does not render the recording or printing device operable.

Nevertheless, if the first and second high-voltage switching circuits $15_k$ and $16_l$ are operated at the same time, a sum of voltage shown by FIG. 2E is supplied to only one selected record electrode $18_m$. The waveform E is obtained by addition of the waveforms B and D. Because of the relationship $V_{15}, V_{16} < V_s$ and $V_{15} + V_{16} > V_s$ in design of the waveform D, electrostatic recording operation is achieved at only points $e_l$, $e_2$, - - - where more than threshold voltage is supplied. In the case where the applied voltage disappears in a moment, recording operation will be performed as the threshold level is reached.

In this manner, electrostatic recording is achieved only when the pulse voltage B from the first high-voltage switching circuit $15_k$ is supplied in coincidence with the application of the pulse voltage D from the second high-voltage switching circuit $16_l$, the sum of the applied voltage being higher than the threshold level $V_s$.

In the following description the first high-voltage switching circuits $15_1$, $15_2$, - - - are used for record pattern selection while the second high-voltage switching circuits $16_1$, $16_2$, - - - are used for electrode group selection. This provides simplicity for the high-voltage switching circuit design and arrangement. It is well known in the art that the electrostatic latent image obtained is this way is thereafter developed through the use of toners of the opposite polarity to the latent charge pattern on the record medium 7. FIG. 3 illustrates waveforms when actual electrostatic recording is achieved in accordance with the above discussed operating principles. Synchronization should be provided between the first high-voltage switching circuit $15_k$ and the second high-voltage switching circuit $16_l$, as will be seen from comparison between the waveforms $A_o$ and $B_o$. However, it is to be understood that the pulse waveform inputted to the second high-voltage switching circuit is delayed a desired period of time $\tau$ with reference to the equivalency to the first high-voltage switching circuit due to the reason that the input voltage to the first switching circuit is supplied in its integrated form to the record electrode, accompanying a time dealy ($\tau$ : a delay time in the leading edge in the waveform of FIG. 2B).

Figure 3:
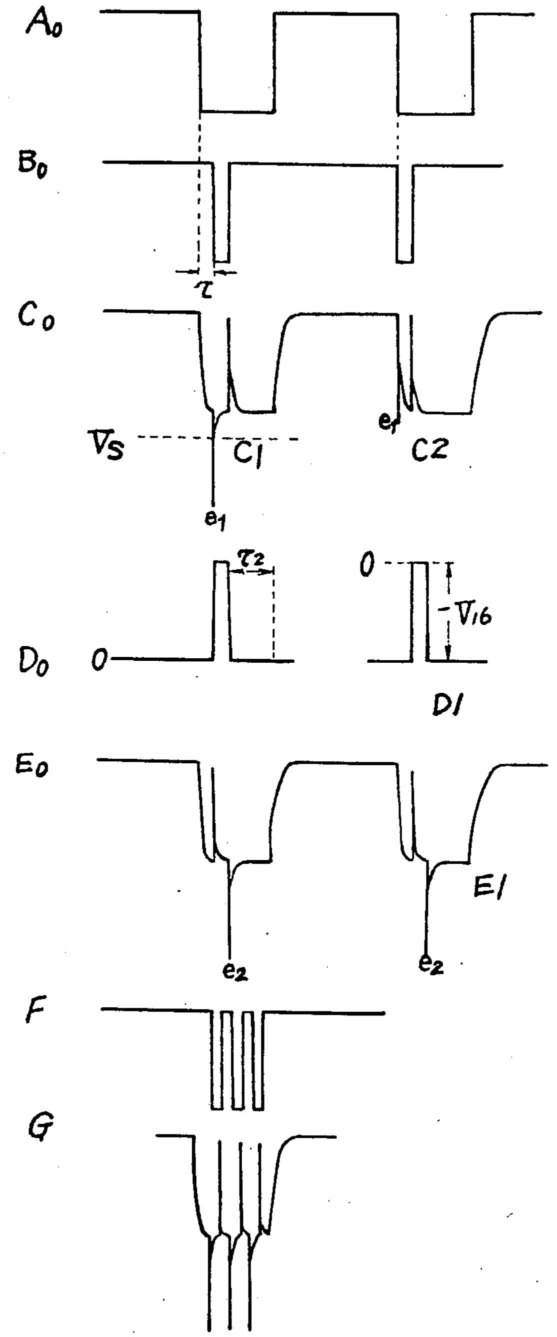

The value of $\tau$ is primarily determinative upon the resistor Z coupled with the record electrode and the capacitor C between the record electrode or its associated leading wire and ground. In case of $\tau < ZC$, the recording at the points $e_1$, $e_2$ (FIG. 2E) will not be achieved unless the output voltage from the second high-voltage switching circuit has the greater amplitude. Another important condition is that the peak value of the second switching circuit should be smaller than the threshold $V_s$. That is to say, selection of a voltage value higher than $V_s$ causes recording to be carried out at undesired points which are not in agreement with the first high-voltage switching circuit. Therefore, the recording operation is insufficient in the case of $\tau < ZC$. $\tau < ZC$ is the essential requirement for the present recording device. However, $\tau$ is not unlimited and should not exceed the output voltage from the first high-voltage switching circuit or the pulse width of FIG. 4A. This will be expressed as follows:

$ZC < \tau < T_1$ ( $T_1$ : the pulse width of FIG. 4A ) In FIG. 3, there is illustrated changes in voltage applied to the record electrode wherein a portion $C_1$ or the waveform $C_O$ established by addition of the waveforms $A_O$ and $B_O$ accompanies a time delay $\tau$. The other portion $C_2$ shows changes in voltage supplied to the record electrode in the absence of such a time delay $\tau$. Such time delay $\tau$ permits the record electrode to receive operating or enabling voltages which exceed the threshold level of the voltage $V_s$.

The following sets forth what is meant by the "leading edge" of the pulse voltage impressed on the induction plate. For convenience the term "leading edge " is used herein at certain points in the specification to refer to portions $l_1$, $l_2$ produced from voltage supplied to the induction plate, and more specifically the negative going portion in case of $B_O$ and the positive going portion in case of $D_O$. Therefore, this is somewhat different from the customary definition. The leading time period is preferrably shorter since the recording of the present invention utilizes the leading edge of the voltage supplied to the induction plate and in other words the differentiated waveform of the voltage supplied to the same. The inventor has experimentarily confirmed that the peak level of the waveform of FIG. 2D becomes extremely low as far as the relationship $\tau_o > ZC_p$ is conditioned wherein $\tau_o$ is the time period of the leading edge and Z is the resistor connected with the record electrode and $C_p$ is the capacitor between the record electrode and the induction plate $\tau_o < ZC_p$ is necessary. The voltage applied to the induction plate may be either of the rectangular form of FIG. 2C or the other form of FIG. 2D since the present method utilizes the differentiation waveform of the voltage supplied to the induction plate. These spike-shaped pulses are obtainable through conventional wiring transformers or ceramic transformers.

The pulse voltage from the second high-voltage switching circuit may be of negative polarity or the positive polarity as shown by the waveform $D_o$. In the latter case recording is carried out with reversal in the leading and trailing edges of the record voltage as viewed from the waveform $E_o$. Alternate pulse voltage as illustrated by the waveform D is also useful.

Although the foregoing description as regards some embodiments of the invention sets forth record operation responsive to application of a single voltage pulse to the induction plate, the present invention is applicable to employment of a plurality of voltage pulses for one-dot recording, for example, three voltage pulses as suggested by the waveform F. When a plurality of voltage pulses or a high-frequency voltage signal is supplied to the record electrode, changes in output voltage appear at the record electrode as illustrated by the waveform G such that the threshold level $-V_s$ contributable to electrostatic recording is exceeded many times thereby enhancing the density of a record image. Operation by utilization of the plurality of the voltage pulses in this way avoids the requirement for establishing the time delay $\tau$ set forth as regards the above embodiments.

The scanning of the record electrodes $18_1$, $18_2$, - - - will be accomplished in the following manner. A first intelligence signal to be recorded is supplied to all of the first high-voltage switching circuits $15_1$, $15_2$, - - - at a time. The specific one or more first high-voltage switching circuits $15_i$ are rendered conductive, permitting voltage supplied to the record electrode $18_i$ via the resistor $Z_i$. A single second high-voltage switching circuit $16_j$ dominating the record electrode to be energized is then rendered conductive such that voltage is supplied to the record electrode through the induction plate $14_i$. Therefore, the record electrode under the control of the induction plate $14_j$ is placed at the operative condition to enable the electrostatic recording or printing.

Subsequently, the next succeeding intelligence signal is impressed on all the first high-voltage switching circuits $15_1$, $15_2$, - - - and under the circumstances the second high-voltage switching circuit controlling the record electrode to be energized is turned on. A sequence of all the events described above is repeated to complete the scanning or cycling of the record electrodes $18_1$, $18_2$.

Instead of sequential scanning of the switching circuits, at least two memories may be provided in such a manner that while one of the memories stores a train of intelligence signals to be supplied to one group of the record electrodes, the intelligence signals contained within the other memory are transferred to the first high-voltage switching circuits $15_1$, $15_2$, thereby to control simultaneously all the record electrodes which belong to the same group. This speeds up the recording.

Figure 6:
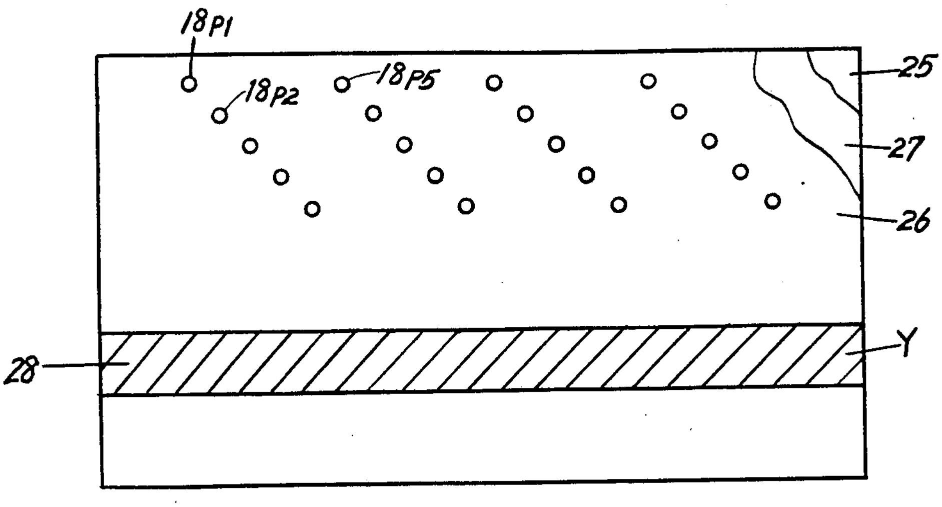
FIG. 6 is a plan view of a record electrode assembly used in the preferred form of FIG. 1 in the course of fabrication.
Figure 7:
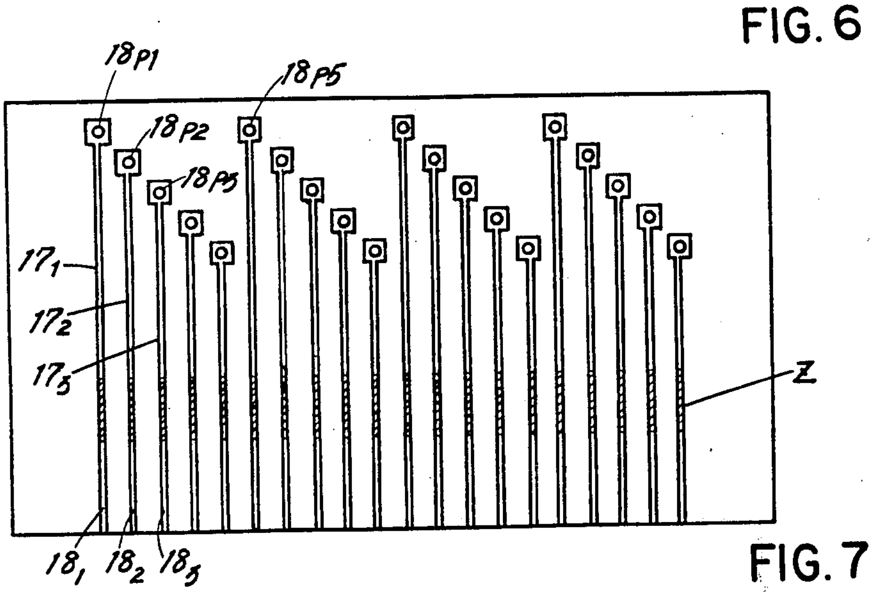
FIG. 7 is a plan view of a completed record electrode assembly.
Figure 8:
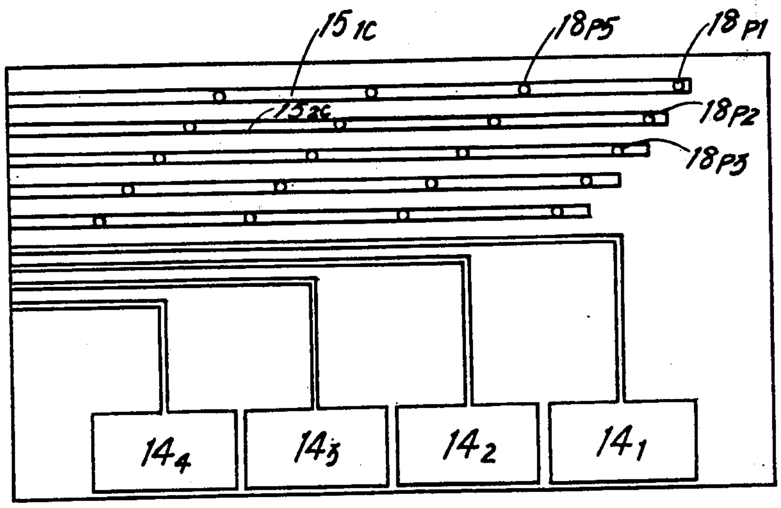
FIG. 8 is a rear view of the completed record electrode assembly shown in FIG. 7.

A typical record head assembly used with the above discussed recording device will be now described in more detail with reference to FIGS. 6 through 8. As noted earlier, it is preferable for mass production that the recording head assembly is fabricated on a thin film substrate 18 made of polyimide or polyethylene telephthal rather than combining discretestrip electrodes together.

Metal layers 25 and 26 are disposed over two major surfaces of the substrate 18 through the use of adhesion, metal evaporation or non-electrolytic plating technology. By way of example, portions designated $18_{p1}$, $18_{p2}$ - - - (FIG. 6) of the polyethylene telephthal substrate 27 of about 20 $\mu$m thick cut to form apertures of the diameter of about 0.8 mm and non-electrolytic plating is then effected to provide interconnections between the upper and lower metal layers through the apertures $18_{p1}$, $18_{p2}$- - - . The metal layer 26 at a portion Y on the upper surface is etched and removed therefrom for deposition of a resistor layer 28. A thin-film resistor layer is desirable for the low resistance requirement in view of the subsequent etching process. For example, evaporation of $N_i - C_r$ alloy of the thickness of about 700 A results in the formation of a resistor of about 200 Ω/ □. Alternatively, if a high resistance is desired, $C_r - S_iO$ (cermet) is evaporated. In this instance the resistor of 1 kΩ/ □ – 2 kΩ/ □ may be obtained. After deposition of photo-resist over the entirety of the upper surface, photo-etching is effected except on the portions $17_1$, $17_2$, $17_3$ - - - marked by oblique lines such that the resistors are formed concurrently with the formation of the pin-shaped record electrodes $18_1$, $18_2$ $18_3$ - - - .

The rear surface of the substrate is subject to the following processes. The rear surface is processed in the same manner as the last step for the upper surface, in which case the entire of the rear surface is covered with photo-resist and selected regions of the photo-resist are etched away to define the lead wires $15_{1c}$, $15_{2c}$, - - - for transmission of voltage from the first high-voltage switching circuits to the respective record electrodes, a plurality of the induction plates $14_1$, $14_2$, and their lead wires, as are viewed from FIG. 8.

The pin-shaped record electrodes confront the induction plates with intervention of the polyethylene telephthal film of about 20 $\mu$m thick so that electrostatic coupling between the induction plate and the record electrodes is enhanced along with good electric isolation therebetween.

Other various methods are applicable although the through-hole technology was utilized in the above illustrative embodiment. For example, silk screen printing technology may be used to cover the entire surface of the substrate with an electrically isolating resist such as epoxy resin except over the portions corresponding to the apertures $18_{p1}$, $18_{p2}$, subsequent to the evaporation step for resistors and the etching step for electrodes and resistors. The electrodes as shown in FIG. 8 are then disposed on the isolating resist.

As described previously, the roller electrode 20 serves to hold the resistor layer $7_b$ of the record medium 7 at ground potential. It will be noted that proper DC voltage, continuously changing analog voltage, a pulse voltage and so forth may be used intead of ground potential to alter discharge conditions and recording density. In addition, a proper voltage changeable in accordance with the intelligence signal is superimposed on the two-value input signal and then supplied to the respective high-voltage switching circuits to alter the recording density.

In the embodiment of FIG. 1, if the induction plates are roughly positioned with respect to the pin-shaped record electrodes, a possibility of producing a ghost image will be provided due to the fact that operation of the one specified induction plate will undesirably place the record electrode adjacent to the record electrode associated with that specified induction plate into the operative condition.

Figure 9:
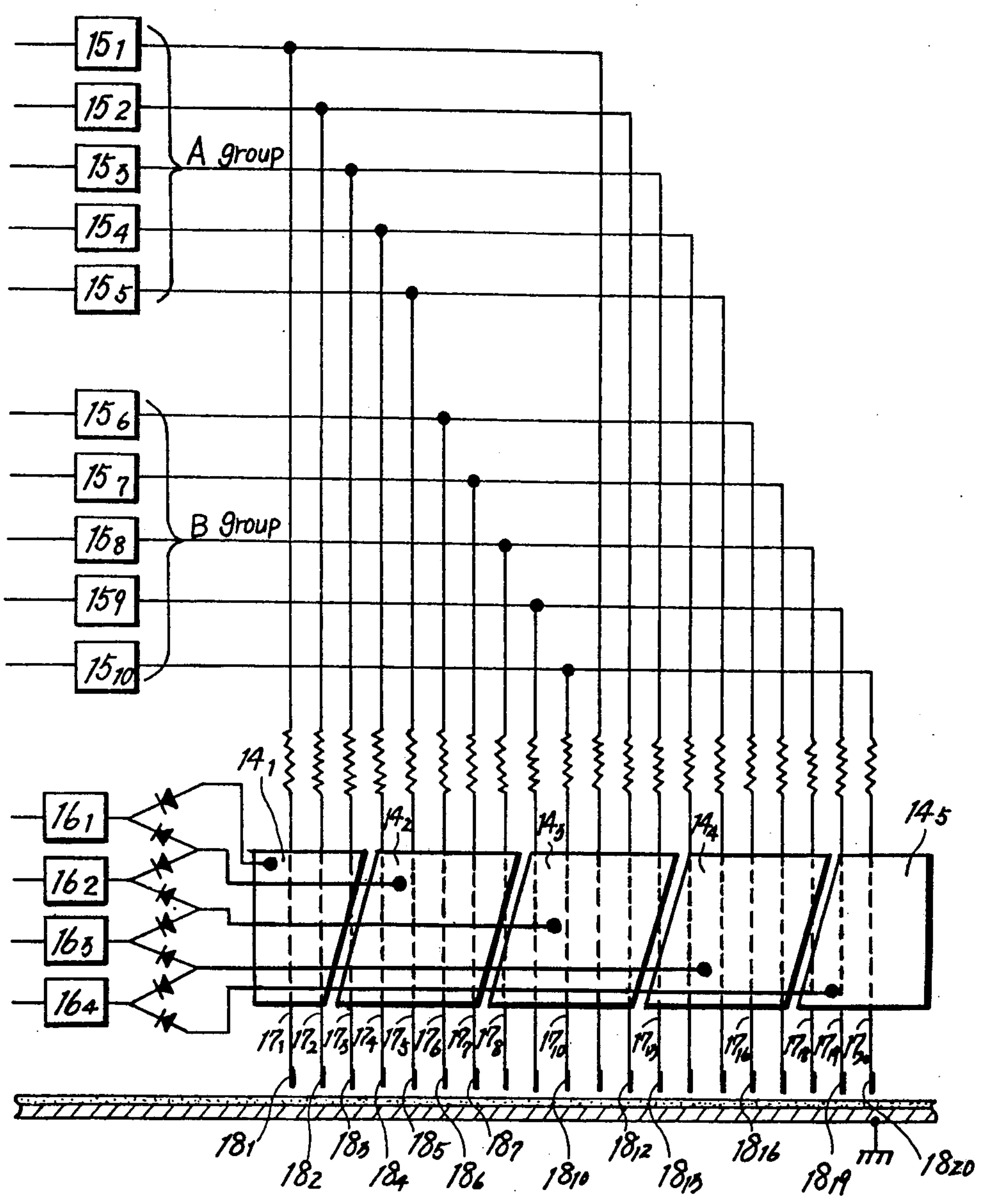
FIG. 9 is a schematic wiring diagram of another preferred form of a record device in accordance with the invention.
Figure 10:
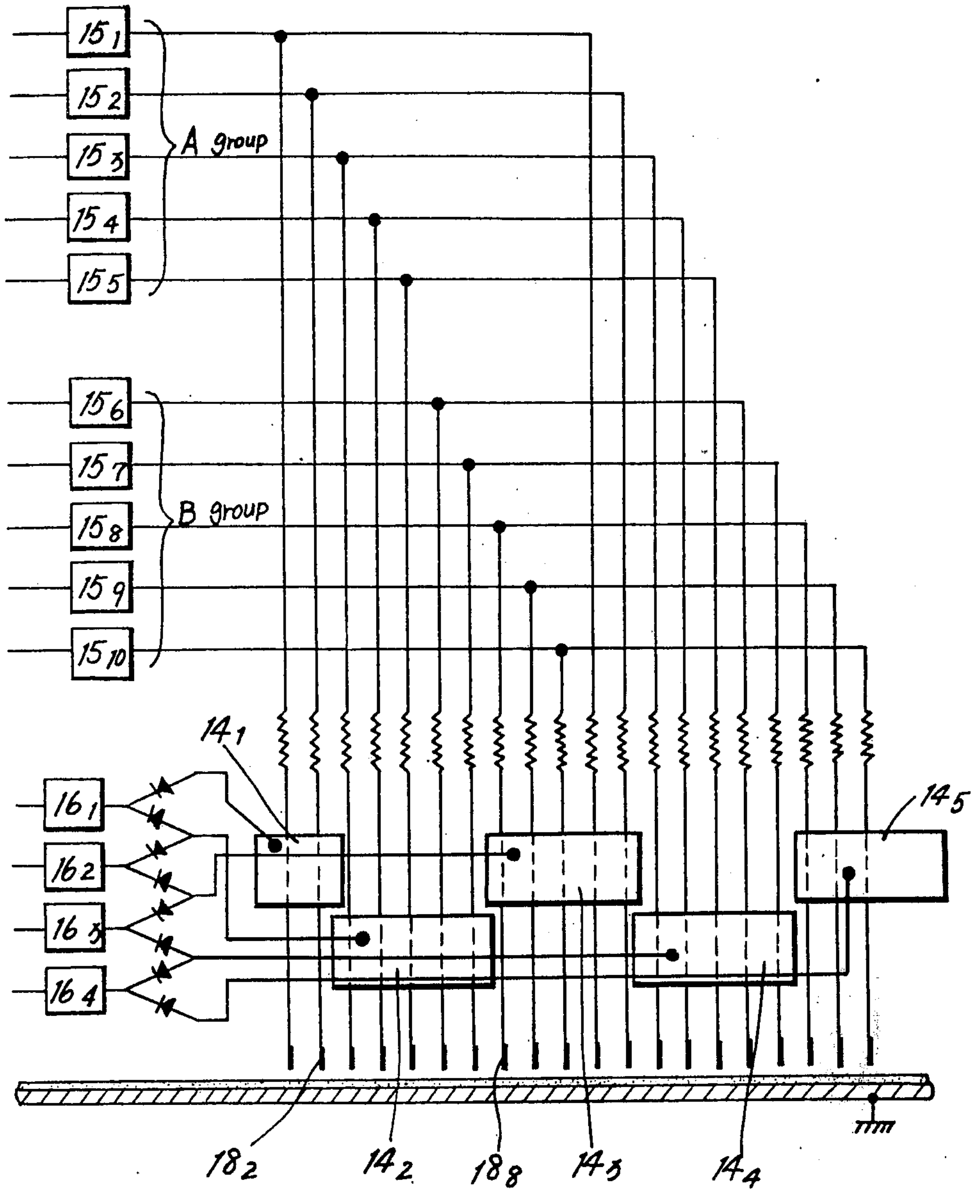
FIG. 10 is a schematic wiring diagram of still another form of a record device in accordance with the invention.

The following embodiments illustrated in FIGS. 9 and 10 are to preclude the possibility of forming any ghost image.

In the embodiments the first high-voltage switching circuits $15_1$ through $15_5$ belong to the first group A whereas the circuits $15_6$ through $15_{10}$ belong to the second group B. The high-voltage switching circuits $15_6$, $15_7$, $15_8$, $15_9$ and $15_{10}$ are coupled with lead wires $17_6$, $17_{16}$, $17_7$, $17_{17}$, $17_8$, $17_{18}$, $17_9$, $17_{19}$ and $17_{10}$, $17_{20}$, respectively. The respective induction plates $14_1$, $14_2$, - - - are inclined with respect to the lead wires. The induction plates $14_1$, $14_2$ and $14_3$ confront with the lead wires $17_1$, $17_3$, $17_3$, $17_8$ and $17_8$, $17_{13}$, respectively. Within the lead wires connected with the high-voltage switching circuit of the group A, the lead wires $17_1$ and $17_2$ confront with only the induction plate $14_1$, the lead wires $17_4$ and $17_5$ confront with the induction plate $14_2$ and the intermediate lead wire $17_3$ confronts with both of the induction plates $14_1$, $14_2$.

In connection with the lead wires connected with the high-voltage switching circuits of the group B, the lead wires $17_6$, $17_7$ confront with the induction plate $14_2$, the lead wire $17_9$, $17_{10}$ confront with the induction plate $14_3$ and the lead wire $17_8$ confronts with both of the induction plates $14_2$, $14_3$.

Although the illustrative embodiment is adapted such that only the lead wire $17_3$ extends over both of the induction plates $14_1$ and $14_2$, all the lead wires $17_2$, $17_3$, $17_4$ may be designed to extend over two adjacent induction plates.

The induction plate $14_1$ is coupled with the switching circuit $16_1$ via a diode 30, and the induction plate $14_2$ is coupled with the switching circuit $16_1$ via a diode 31 and also with the switching circuit $16_2$ via a diode 32.

Similarly, the induction plate $14_3$ is coupled with the switching circuit $16_2$ via a diode 33 and also with the switching circuit $16_3$ with a diode 34. The induction plate $14_4$ is coupled with the switching circuit $16_3$ via a resistor 35 and with the switching circuit $16_4$ via a resistor 36. The induction plate $14_5$ is coupled with the switching circuit $16_4$ via a diode 37.

When it is desired to operate the pin-shaped record electrodes $18_1$ through $18_5$, the first high-voltage switching circuits $15_1$ through $15_5$ of the group A are first turned on and at the same time the switching circuit $16_1$ is also turned on. Operation of the switching circuit $16_1$ permits the induction plates $14_1$ and $14_2$ to receive voltage pulse via the diodes 30 and 31 respectively. Due to the activities of the induction plates $14_1$ and $14_2$ voltage is induced on the pin-shaped electrodes $18_1$ through $18_8$. However, since the high-voltage switching circuits $15_6$ through $15_{10}$ of the group B are not active under this circumstances, the record electrodes $18_6$ through $18_8$ connected with the high-voltage switching circuit of group B are not permitted to perform the recording or spontaneous discharge. Only the pin electrodes $18_1$ through $18_5$ which confront with the induction plates $14_1$, $14_2$ and communicate with the high-voltage switching circuits of the group A can be enabled for recording.

Thereafter, the high-voltage switching circuits $15_6$ through $15_{10}$ of the group B are turned on and the selection switching circuit $16_2$ becomes active. This permits application of a voltage pulse to the induction plates $14_2$ and $14_3$ and and, as a result, voltage induction occurs on the pin electrodes $18_3$ through $18_{13}$. Only the pin electrodes $18_6$ through $18_{10}$ coupled with the high-voltage switching circuits of the group B can accomplish recording. In this manner, the recording is accomplished in accordance with combinations of the induction plates supplied with voltage pulse and the pin-shaped $18_1$ through $18_7$ upon application of voltage pulses to the induction plates $14_1$ and $14_2$. Only the pin-shaped electrodes $18_1$ through $18_5$ associated with the high-voltage switching circuits of the group A provide the recording functions. Subsequently, when the high-voltage switching circuits $15_6$ through $15_{10}$ of the group B are turned on together with the switching circuit $16_2$, voltage is induced on the pin electrodes $18_2$ through $18_{12}$ by virtue of the activities of the induction plates $14_2$ and $14_3$. Under record electrodes in their operative conditions.

It will be considered that the respective plates are shifted one pitch to the left in the embodiment of FIG. 9. In order to accomplish the recording by means of the pin-shaped electrodes $18_1$ through $18_5$, the switch circuit $16_1$ is first turned on and at this time the high-voltage switching circuits $15_1$ through $15_5$ of the group A are turned on. Voltage induction occurs on the pin electrodes under these circumstances only when the pin electrodes $18_6$ through $18_{10}$ are operatively associated with the high-voltage switching circuits of the group B.

Therefore, the advantages of the embodiment of FIG. 9, that ensure accurate recording even if the induction plates are shifted to the left from the positions shown therein, are ascertained by referencing to the above operational explanation. The same may be applied to the case where the induction plates are shifted to the right or the case that the induction plates are shifted two-pitch.

FIG. 10 illustrates another preferred embodiment of the present invention. In the embodiment herein the respective induction plates are overlapped with each other. Of course, the accurate recording function is achieved even if the respective induction plates are shifted one-pitch or two-pitch to the left of the right and, for example, the induction plate $14_2$ is roughly finished in such a manner that the both ends thereof extend to the pin-shaped record electrodes $18_2$ and $18_8$.

While the above mentioned embodiments of FIGS. 9 and 10 relate to the two groups of the high-voltage switching circuits, the satisfactory results are obtainable through the use of three or more groups of the high-voltage switching circuits.

In the electrostatic recording or printing the simplest and most effective way to increase the recording density is to increase voltage supplied to the record electrodes. More specifically, referring to FIG. 2(E) this is accomplished by increasing the voltage amplitudes $(V_{15} + V_{16})$ at the portions $e_1$, $e_2$, However, amplitude selection is critical because the relationship $(V_{15} + V_{16}) < 2V_s$ should be maintained. This is due to the following reasons. In the event that the output voltage amplitude $V_{15}$ from the first high-voltage switching circuit $15_k$ ($k$ : any one of numerals 1 through 5) is greater than the threshold level $V_s$ (that is, $V_s < V_{15}$), voltage of the record electrodes $18_k$, $18_{k+5}$, $18_{k+10}$ and $18_{k+15}$ exceed the threshold level $V_s$ without regard to applied voltage to the induction plates, with the results that the record electrodes $18_{k+5}$, $18_{k+10}$ and $18_{k+15}$ undesirably operate to cause recording error.

In the case where the output voltage $V_{16}$ of the second high-voltage switching circuit 16 $m$ ($m$ : any one of numerals 1 through 4) is selected as $V_{16} > V_s$, application of such voltage $V_{16}$ to the specific induction plate 14 $m$ results in voltage induction on the record electrodes $18_{5(m-1)+1}$, $k8_{5(m-1)+2}$, - - - $18_{5(m-1)+5}$ which corresponds to that induction plate, the thus induced voltage having a peak value higher than the threshold level $V_s$ such that recording is carried out at the record electrodes $14_{5(m-1)+2}$ through $14_{5(m-1)+5}$. In this manner, the permissible maxium value of voltage to the record electrodes should be correlated with the threshold level as $V_{15} - V_{16} < 2V_s$.

Figure 11:
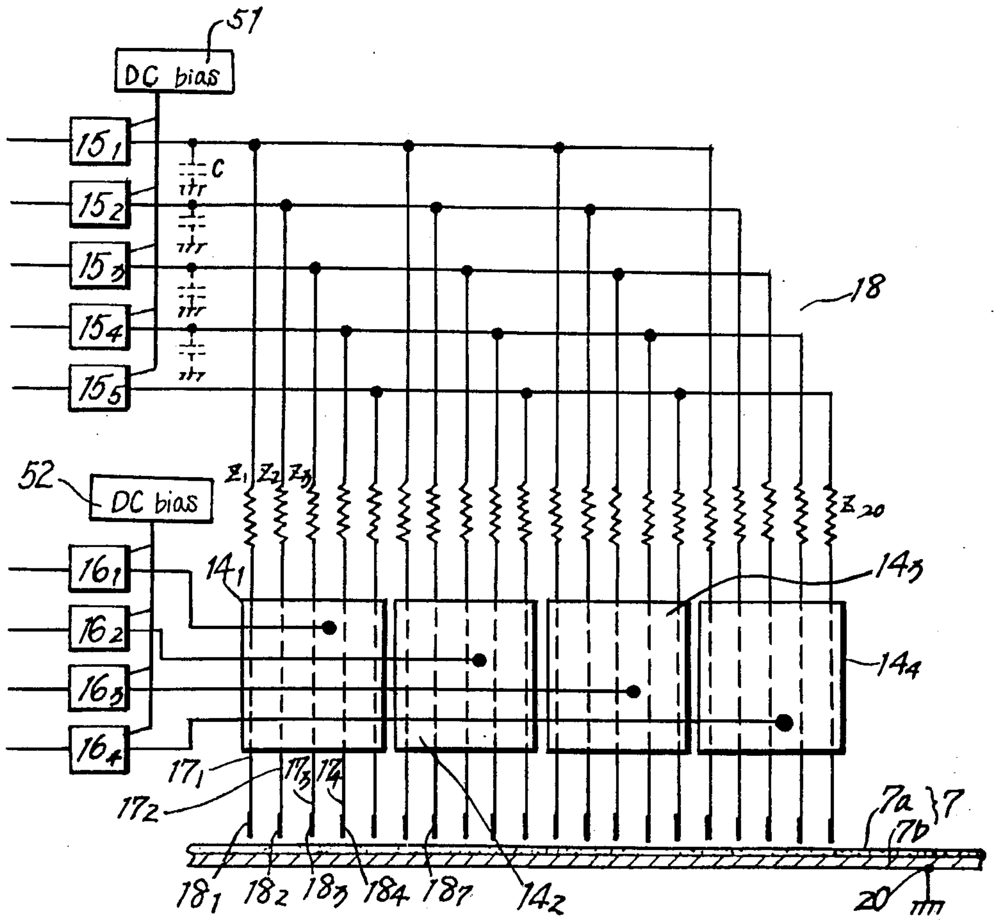
FIG. 11 is a schematic wiring diagram of yet another form of a record device in accordance with the invention.
Figure 12:
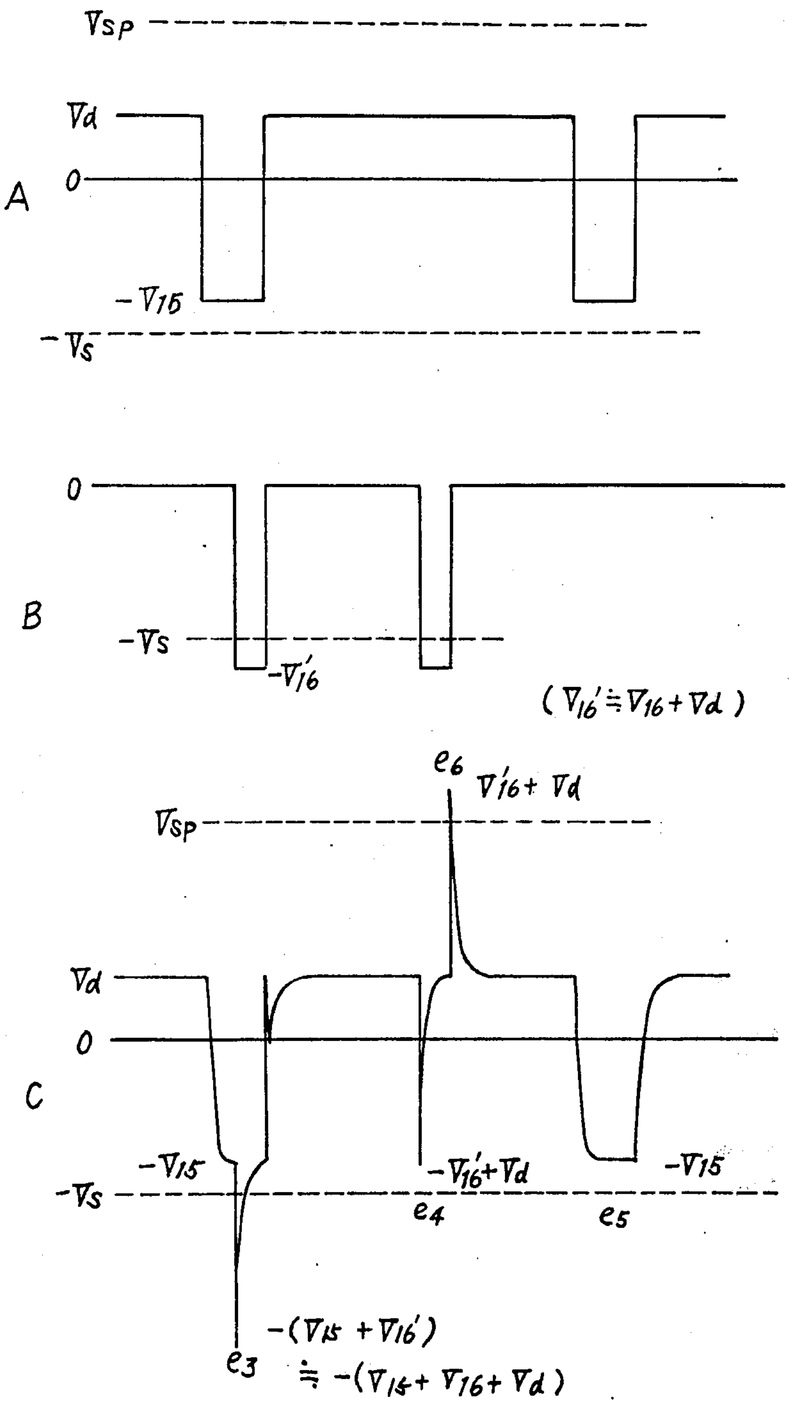
FIG. 12, consisting of A through C, and 13, consisting of A through D, are time charts of voltage waveforms occurring at the form of FIG. 11.

An alternative for the purpose of increasing the recording density is adapted to overcome the above limitations or requirements as regards voltage amplitude to be supplied to the record electrodes without accompanying recording error. As illustrated in FIG. 11, a DC bias voltage supply circuit 51 is operatively associated with the first high-voltage switching circuits $15_1$ through $15_5$ while a second DC bias voltage supply circuit 52 is operatively associated with the second high-voltage switching circuits $16_1$ through $16_4$. A positive DC bias voltage $V_d$ is superposed on the output voltage of the first high-voltage switching circuits $15_1$ through $15_5$, as viewed from FIG. 12(A). The positive DC bias voltage $V_d$ should be selected as $V_d < V_{sp}$ wherein $V_{sp}$ is the threshold level of voltage in case of positive polarity and generally higher 50 – 100 volts than the negative polarity threshold level. The record electrodes $18_1$ through $18_{20}$ produce a positive charge image on the record medium 7 upon receipt of voltage higher than the threshold level $V_{sp}$. The peak value $-V_{16}$ of the output voltage of the second high-voltage switching circuits $16_1$ through $16_4$ is selected to exceed the threshold level $-V_s$ and equal substantially $-(V_{16} + V_d)$, as suggested by FIG. 12(B). In this way, voltages from the first high-voltage switching circuits $15_1$ through $15_5$ and from the second high-voltage switching circuits $16_1$ through $16_4$ are preselected as suggested by FIGS. 12(A) and 12(B). FIG. 12(C) (corresponding to FIG. 2E) shows the waveform wherein an integration form of (corresponds to FIG. 2B although not shown in FIG. 12 for simplicity) of the waveform of FIG. 12(A) is superimposed on a differentiation form (corresponds to FIG. 2D although not shown in FIG. 12) of the waveform of FIG. 12(B). The thus superimposed voltage is supplied to the record electrodes $18_1$ through $18_{20}$. The voltage $-(V_{15} + V_{16})$ at the point $e_3$ within the superimposition waveform is substantially equal to $-(V_{15} + V_{16} + V_d)$ and, therefore, increased about the bias voltage $V_d$ as compared with the voltage $-(V_{15} - V_{16})$ at the points $e_1$, $e_2$, - - - as shown in FIG. 2. This enables improvement in the recording density to an extent corresponding to the bias voltage $V_d$. It will be clear from FIG. 12(B) that the voltage $-V_{16} + V_d$ at the points $e_4$, $e_5$ not contributive to the recording is substantially equal to $-V_{16}$ and $-V_{15}$ in spite of $V_s < V_{16}'$ and, in any case, does not exceed the threshold level $-V_s$. Nevertheless, because of the voltage at the point $e_6$ being $V_{16}' + V_d$, a positive charge pattern will be undesirably formed at the point $e_6$ as for as $V_{sp} < V_{16}' + V_d$. To this end, the requirement $V_{16}' + V_d < V_{sp}$ is necessary. S an alternate, such bias voltage may be impressed on the roller electrode 20. In this instance voltage of the opposite polarity should be supplied from the DC bias voltage circuit 21.

Figure 13:
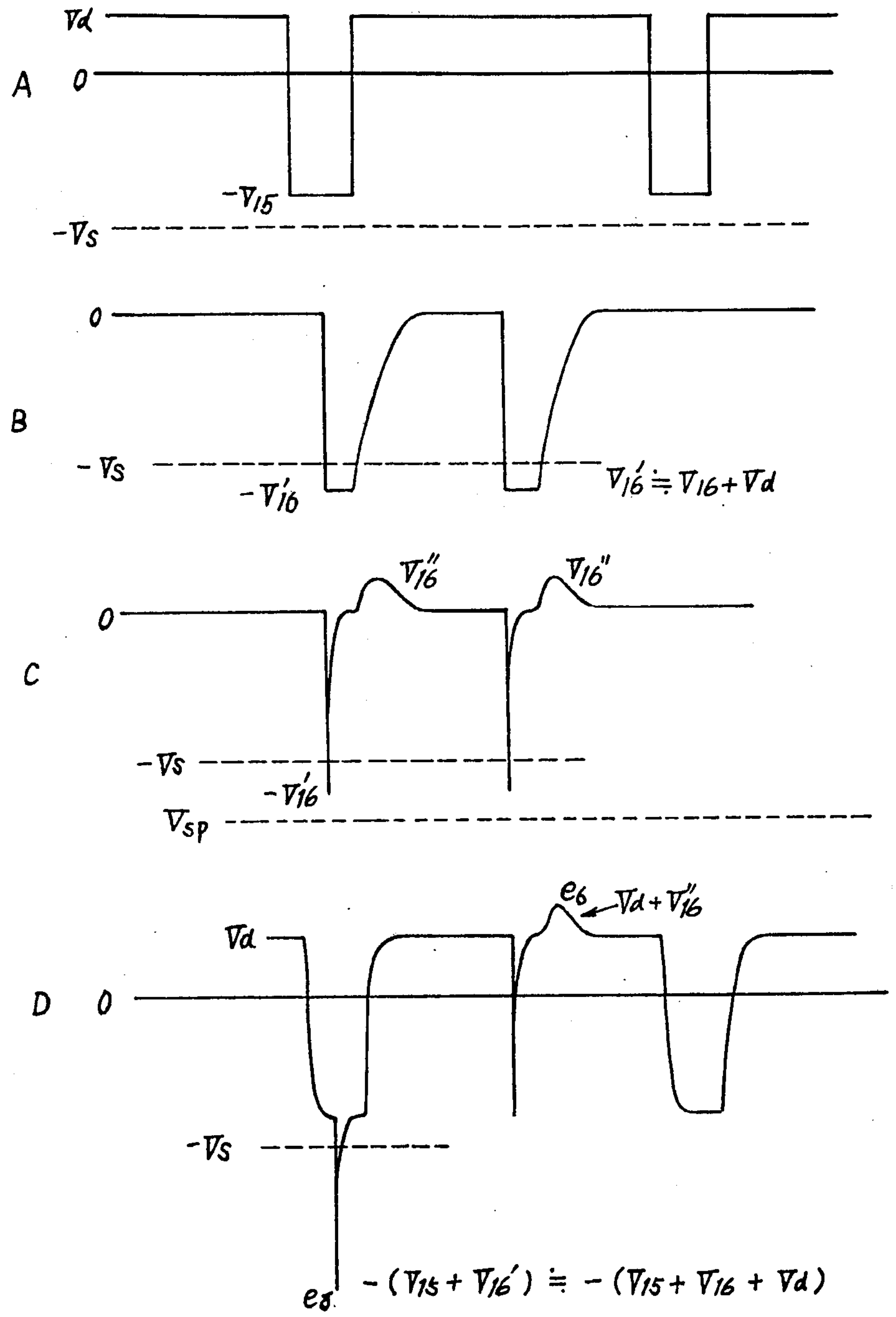
Figure 14:
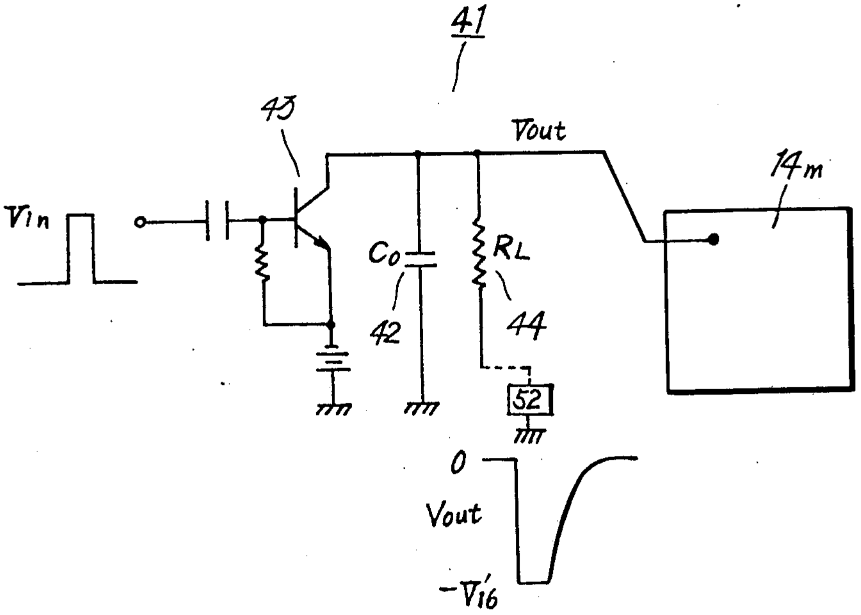
FIG. 14 is a circuit diagram of a circuit for generating signals shown in FIG. 13(B).
Figure 15:
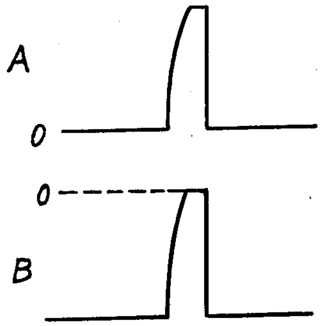
FIG. 15 is a waveform diagram of signals which may be used instead of the signals shown in FIG. 13(B).

FIGS. 13 and 15 illustrate another embodiment which is capable of reducing the voltage value at the point $e_6$ without reducing the DC bias voltage $V_d$. That is to say, it is necessary to reduce the peak level $V_{16}'$ of the voltage at the point $e_6$ as shown in FIG. 12(C) for this object. Because the level $V_{16}'$ corresponds to the differentiation waveform of the leading edge of the pulse of FIG. 12(B), the object can be accomplished by reducing the slope of the leading edge of the pulse of FIG. 12(B) and reducing the peak level of the differentiation waveform. The pulse signal of FIG. 12(B) is passed through a circuit 41 shown in FIG. 14 and therefore changed into the signal having a smaller leading slope. The result is shown in FIG. 13.

The circuit 41 of FIG. 14 is coupled to the second high-voltage switching circuit 16 *m* and the bias voltage supply circuit 52. A capacitor 42 represents a combination of distributed capacitors and additional capacitors between the leading wire or the induction plates and ground. A normally non-conductive transistor 43 becomes conductive in response to receipt of the input pulse Vin to the input terminal thereof. Such a conduction permits voltage drop in the output voltage Vout from zero up to $-V_{16}'$. If the input pulse disappears, the transistor 43 is again placed at the non-conductive condition such that charge stored on the capacitor 42 is discharged gradually through a load resistor 43. It follows that the output voltage Vout is returned from $-V_{16}'$ to zero at a time constant $R_L C_o$ wherein $R_L$ is the resistance value of the load resistor 44 and $C_o$ is the capacitance value of the capacitor 42.

Transmission of the thus obtained signal of FIG. 13(B) to the induction plate 14 *m* provides the differentiation effects therefor so that the differentiation waveform of FIG. 13(C) having an extremely small positive peak level $V_{16}''$ as compared with the negative peak level $-V_{16}'$ is electrostatically induced on the record electrodes $18_{5(m-1)+1}$ through $18_{5(m-1)+5}$. During the recording operation the signal of FIG. 13(C) is superimposed on the integration waveform of the voltage pulse of FIG. 13(A) and then supplied via the selected record electrode $18_i$ to the record medium 7. The voltage at the point $e_6$ is $V_{16}'' + V_d$ and hence relatively smaller than the voltage $V_{16}' + V_d$ shown in FIG. 12(C). A much higher DC bias voltage $V_d$ may be employed in proportion to such reduction in the voltage at the point $e_6$ to improve correspondingly the recording or printing density. While the signal supplied to the induction plates in the foregoing description is the negative going trailing edge pulse voltage as shown in FIG. 13(D), positively leading pulse voltage may be useful by increasing the slope $dV/dt$ at the negative going region and decreasing the same at the positive going region.

As discussed above, the recording error or noise will occur at the record electrodes $14_{5(m-1)+2}$ through $14_{5(m-1)+5}$ when it is desired to operate only the specific record electrode $14_{5(m-1)+1}$ upon application of voltage $V_{12}$ ($V_s < V_{12}$) to the induction plate 10 *m* through the second high-voltage switching circuit 12 *m*. This is due to the fact that the impedance of the first high-voltage switching circuit is relatively high whether in the on state or in the off state.

Nevertheless, different situations will be encountered in the case where the impedance of the first high-voltage switching circuit 11 connected with the record electrode $14_{5(m-1)+1}$ is sufficiently high whereas the impedance of the first high-voltage switching circuits $11_2$ through $11_5$ connected with the record electrodes $14_{5(m-1)+2}$ through $14_{5(m-1)+5}$is low. That is to say, the spike voltage is induced at a higher level on the record electrode $14_{5(m-1)+1}$ connected with a high impedance circuit due to voltage supplied from the second high-voltage switching circuit 12 *m* to the induction plate 10 *m*, and at a lower level on the record electrodes $14_{5(m-1)+2}$ through $14_{5(m-1)+5}$ connected with low impedance circuits. Therefore, even if $V_s < V_{12}$, the induction voltage on the record electrodes connected with the low impedance circuits may become a value smaller than $V_s$ by proper choice of the impedance values of the switching circuits and the resistance value of the resistors Z. This permits increase in the recording density at the record electrode $14_{5(m-1)+1}$ and removal of noise at the remaining record electrode $14_{5(m-1)+2}$ through $14_{5(m-1)+5}$.

Another important advantage of employment of the low impedance switching circuits is to alleviate "smear" in the record which will occur due to electrostatic coupling via capacitors. In accordance with the above discussed embodiment of the invention, induction voltage on the adjacent record electrodes is considerably reduced because the impedance of the switching circuits connected with the non-selected record electrodes is extremely low.

Figure 16:
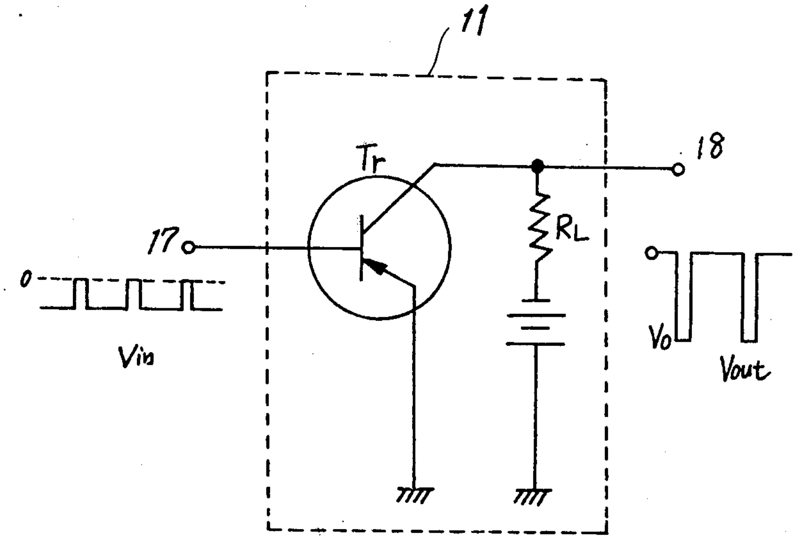
FIG. 16 is a circuit diagram of a high-voltage switching circuit.

A typical example of the high-voltage switching circuit having the advantageous properties set forth above is suggested by FIG. 16. This includes a transistor $T_r$ which is turned on and off in response to the control signal Vin via the base terminal 17 thereby to produce the output voltage Vout from the output terminal 18. When it is desired to perform the recording, the input terminal 17 is held at zero potential to render the transistor $T_r$ non-operative. During non-recording period a negative voltage sufficient to render the transistor $T_r$ conductive is provided therefor. The collector of the transistor $T_r$ is coupled with a negative voltage source $V_{11}$ via a load resistor $R_L$. During a non recording period the negative voltage is applied to the transistor $T_r$ to turn the same on and the output voltage thereof is maintained at zero. In this case, when viewing such circuit arrangement from the record electrode, its impedance is extremely low, of course.

When the signal is applied to the terminal 17, the transistor $T_r$ becomes non-operative and the collector voltage thereof is raised up to $V_{11}$. This enables the printing. In this case, the circuit exhibits an extremely high impedance. While only certain embodiments of the present invention have been described, it will be apparent to those skilled in the art that various changes and modifications may be made therein without departing from the spirit and scope of the invention as claimed.

What is claimed is:

1. An electrostatic recording or printing device comprising:

a record medium on which a record image is to be disposed;

a record electrode spaced against the record medium to form a gap therebetween;

an electrostatic induction plate disposed over the record electrode or its associated lead wires and capacitively coupled thereto via insulation means;

an impedance element;

a pair of voltage sources switchable between first and second voltage levels, one being connected with the record electrode via the impedance element and the other being connected with the record electrode via the electrostatic induction plate, wherein the record electrode is activated by the sum of voltages from the first and second sources.

2. An electrostatic recording device as set forth in claim 1 wherein the record electrode and the impedance element is formed directly on a single sheet and the induction plate is disposed on the same sheet with intervention of a dielectric spacer member.

3. An electrostatic recording device comprising:

a plurality of groups of record electrodes, corresponding record electrodes in each group being connected in common;

a plurality of impedance elements each of which is connected with each of the commonly connected record electrodes;

a plurality of first high-voltage switching circuits connected with the commonly connected record electrodes via the respective impedance elements;

a plurality of electrostatic induction plates, the number of which corresponds to the number of the groups of the record electrodes, said electrostatic induction plates being disposed adjacent each of the record electrode groups or their associated lead wire portions and capacitively coupled thereto via insulation means; and a plurality of second high-voltage switching circuits connected with the induction plates.

4. An electrostatic recording device as set forth in claim 3 wherein a period of time $\tau_1$ required from operation in the first high-voltage switching circuits to operation in the second high-voltage switching circuits is correlated as $\tau_1 > ZC$ wherein Z is the impedance value of the impedance elements and C is the capacitance value between the record electrodes and a corresponding induction plate.

5. An electrostatic recording device as set forth in claim 3 wherein a period $\tau_2$ of a leading edge of the output voltage from the second high-voltage switching circuit is correlated as $\tau_2 < ZC_p$ wherein Z is the impedance value of the impedance elements and $C_p$ is the capacitance value of a capacitor between the induction plate and the record electrodes.

6. An electrostatic recording device as set forth in claim 3 wherein each of the first high-voltage switching circuits receives an image determining signal while each of the second high-voltage switching circuits receives a record position determining signal.

7. An electrostatic recording device comprising a recording head carrying a multiplicity of record electrodes and a record medium on which a charge pattern is disposed by virtue of discharge on the record electrodes, said recording device comprising:

means for dividing the multiplicity of the record electrodes into a predetermined number of groups;

first high-voltage switching circuits divided into a predetermined number of groups, the adjacent groups of the record electrodes being operatively associated with the different groups of the first high-voltage switching circuits, respectively;

circuit means for connecting the thus associated record electrodes and switching circuits;

a plurality of electrostatic induction plates provided for each of the groups of the record electrodes said induction plates being capacitively coupled to said record electrode via insulation means; and second high-voltage switching circuits connected with the respective electrostatic induction plates.

* * * * *